(12) United States Patent
Lee

(10) Patent No.: US 9,645,345 B2
(45) Date of Patent: May 9, 2017

(54) OPTICAL ELEMENT ALIGNMENT AND RETENTION FOR OPTICAL INSTRUMENTS

(71) Applicant: Molecular Devices, LLC, Sunnyvale, CA (US)

(72) Inventor: Lawrence Lee, Sunnyvale, CA (US)

(73) Assignee: Molecular Devices, LLC, Sunnyvale, CA (US)

( * ) Notice: Subject to any disclaimer, the term of this patent is extended or adjusted under 35 U.S.C. 154(b) by 6 days.

(21) Appl. No.: 14/813,890

(22) Filed: Jul. 30, 2015

(65) Prior Publication Data

US 2017/0031125 A1   Feb. 2, 2017

(51) Int. Cl.
| G02B 7/00 | (2006.01) |
| G02B 21/16 | (2006.01) |
| G02B 26/00 | (2006.01) |
| G02B 21/36 | (2006.01) |

(52) U.S. Cl.
CPC ............. *G02B 7/006* (2013.01); *G02B 7/003* (2013.01); *G02B 21/16* (2013.01); *G02B 26/008* (2013.01); *G02B 21/361* (2013.01)

(58) Field of Classification Search
CPC ......... G02B 7/006; G02B 7/003; G02B 21/16
USPC ................. 359/368, 385, 399, 889, 891, 892
See application file for complete search history.

(56) References Cited

U.S. PATENT DOCUMENTS

| 1,780,384 | A | * | 11/1930 | Green | G03B 17/12 359/892 |
| 1,829,867 | A | * | 11/1931 | Koster | G03B 17/12 359/892 |
| 2,273,430 | A | * | 2/1942 | Bing | G03B 17/12 359/611 |
| 2,627,207 | A | * | 2/1953 | Bell | G03B 27/73 355/71 |
| 2,660,926 | A | * | 12/1953 | Talley | G02B 26/007 359/889 |
| 3,758,200 | A | * | 9/1973 | Saito | G02B 26/007 359/892 |
| 6,011,662 | A | * | 1/2000 | Evans | F21S 10/007 359/885 |
| 6,102,556 | A | * | 8/2000 | Lieberman | G03B 17/12 359/892 |
| 6,313,960 | B2 | | 11/2001 | Marquiss et al. | |
| 6,414,805 | B1 | * | 7/2002 | Reichman | G02B 21/06 359/351 |
| 8,941,916 | B2 | * | 1/2015 | Heise | G01N 1/2813 359/391 |

* cited by examiner

*Primary Examiner* — Frank Font
(74) *Attorney, Agent, or Firm* — Bella Fishman

(57) ABSTRACT

An optical element holder includes receptacles for retaining optical elements, and is configured to move a selected optical element into an optical path whereby a light beam passes through the selected optical element. The optical element holder is configured to retain the optical elements in a manner that mitigates or avoids misalignment of the optical elements, thereby mitigating or avoiding unwanted deviations in the path of the light beam. The optical element holder may be part of a microscope or other optical instrument.

17 Claims, 10 Drawing Sheets

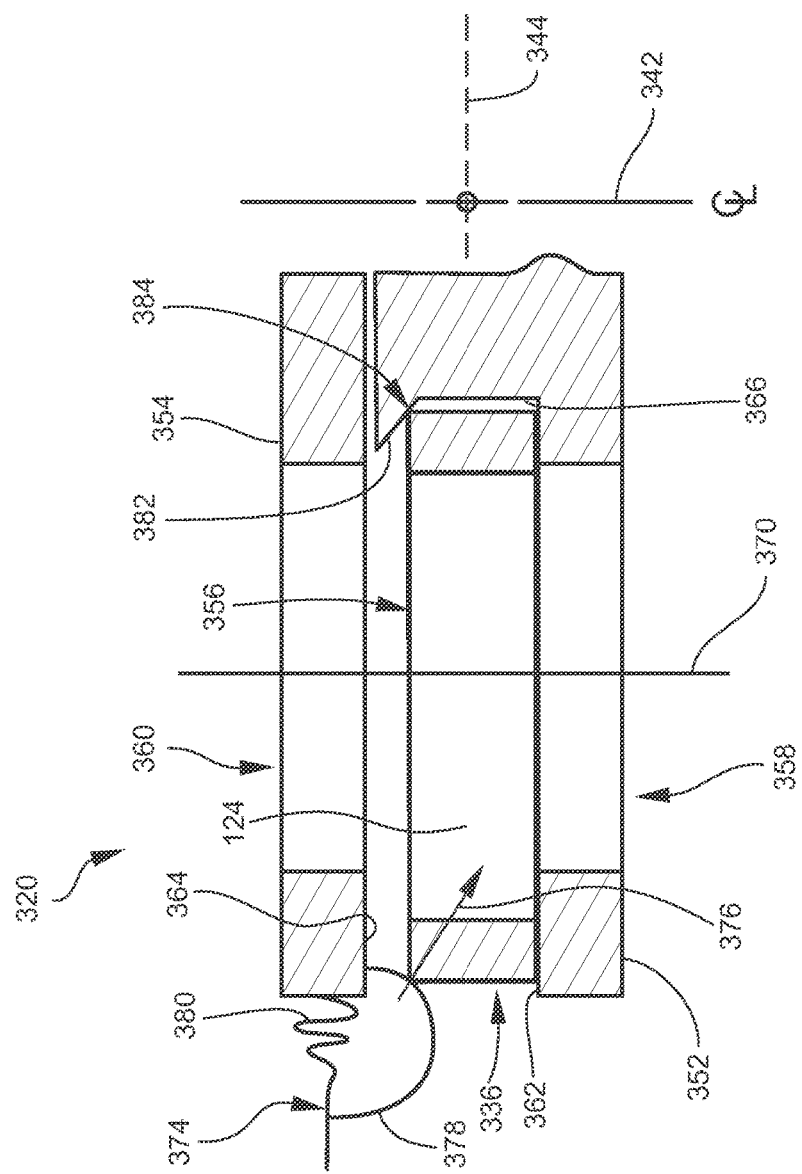

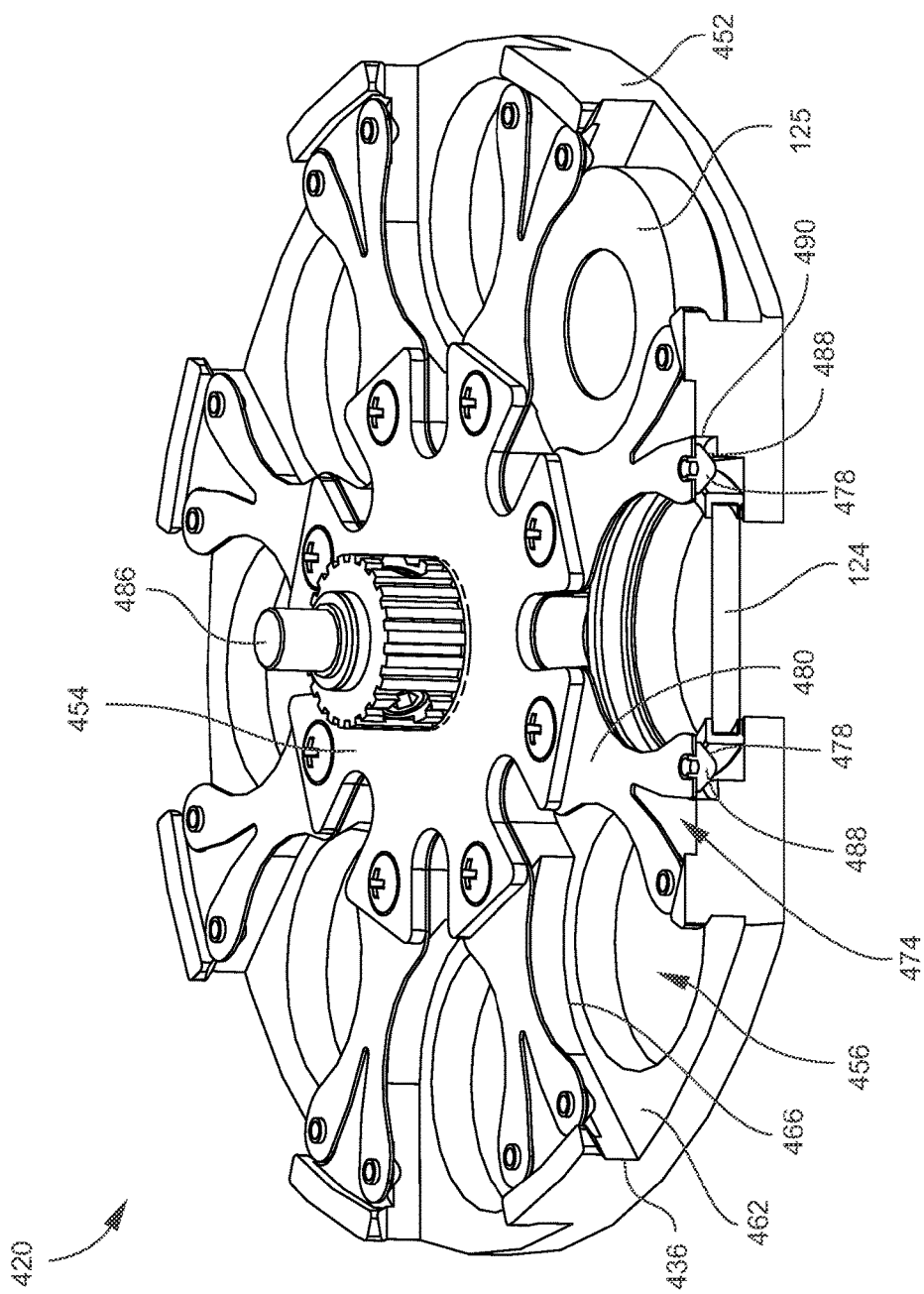

OPTICAL ELEMENT ALIGNMENT AND RETENTION FOR OPTICAL INSTRUMENTS

TECHNICAL FIELD

This present invention generally relates to devices and methods for aligning and retaining optical elements, such as filters, lenses, or the like, in an optical element holder such as an optical element wheel or slide, and to systems utilizing such devices and methods.

BACKGROUND

Optics-based instruments may utilize various types of optical elements for modifying light incident on the optical elements. Depending on the type, an optical element may modify light by, for example, filtering, collimating, focusing, inverting, beam steering, beam splitting, attenuating, etc. As one specific example, optical filters are utilized when it is desired to transmit light at a specific wavelength while preventing transmission of light at other wavelengths. An array of optical filters having different wavelength transmission characteristics may be provided to enable a user of the instrument to select a wavelength for transmission among different wavelengths made available by the array of optical filters. The array of optical filters may be mounted in a filter holding device such as a filter wheel that allows a selected optical filter to be rotated into an operating position at which the selected optical filter becomes part of an optical path and thus is effective for filtering light propagating along that optical path. Another type of filter holding device is a filter slide that allows a selected optical filter to be linearly translated into the operating position. Other types of optical elements, such as lenses, windows, mirrors, etc., may likewise be supported as an array in an optical element holding device.

Examples of instruments that often provide optical element holding devices such as filter wheels include various types of microscopes, one example being a confocal microscope that acquires images of a sample under analysis at different wavelengths (colors). Another example are devices (e.g., optical readers, plate readers, multi-mode readers, etc.) that measure a particular type of optical property or activity of a sample such as reflection/scattering, luminescence, fluorescence, absorbance, etc. A further example are devices that produce spectral data from a sample, such as spectroscopy devices, spectrophotometers, etc. Some of these optical instruments provide both an "excitation" light path from a light source to the sample under analysis and an "emission" light path from the sample to a light detector. That is, the excitation light path is utilized to irradiate the sample, and the emission light path is utilized to transmit the light reflected or emitted from the irradiated sample to the light detector for measurement or imaging. Such instruments may include both an optical element holding device (e.g., an "excitation" filter wheel) positioned in the excitation light path and another optical element holding device (e.g., an "emission" filter wheel) positioned in the emission light path.

An optical element holding device typically provides a number of individual mounting locations, referred to herein as optical element receptacles, at which respective optical elements are retained. Individual optical elements may be loaded into respective receptacles and thereafter removed as needed. In an ideal case, the optical element holding device retains each optical element in a fixed, repeatable position in the corresponding receptacle. In this way, when any of the optical elements currently mounted to the optical element holding device is moved into the optical path, that optical element is in the same position relative to the optical path as any other optical element previously or subsequently moved into the optical path. Also, when any of the optical elements currently mounted to the optical element holding device is replaced with a new optical element in the same receptacle, the new optical element will be in the same position in the receptacle as the optical element previously occupying that particular receptacle. Moreover, for many types of optical elements (e.g. filters and certain types of lenses), in the ideal case the optical element holding device retains each optical element in a perfect orientation (or perfectly aligned position) in the corresponding receptacle. When an optical element is retained in the perfectly aligned position and is moved by the optical element holding device into an optical path, the optical filter will be perfectly aligned with the optical path and thus with the light beam propagating along the optical path. Consequently, the light beam follows a straight path (e.g., is not turned or shifted) through the optical element holding device including while the light beam passes through the thickness of the optical element.

However, in practice some optical element holding devices provide slots through which the optical elements are loaded and thereafter removed. For example, a wheel-type holding device may provide radial slots such that the optical elements are loaded and removed along radial directions. Such holding devices provide a small but perceptible clearance in each optical element receptacle to facilitate loading and removal of the optical elements. That is, each receptacle is sized such that there is some open space between the optical element residing in the receptacle and the surrounding structure of the holding device. This clearance may allow the optical element to be inadvertently loaded into the receptacle with an angular tilt, which results in the light beam being shifted or tilted. Additionally, after loading an optical element into the receptacle (even if properly done such that the optical element is initially well aligned), the optical element may become misaligned over time. For example, operational vibration may cause the optical elements to shift or tilt over time. Misalignment may be problematic for various types of optical elements. For example, when several optical filters (i.e., different color filters) are utilized during a single image acquisition, these angular tilts in the optical filters may induce a phenomenon referred to as "pixel shift." Pixel shift refers to the misalignment between the individual color images that occurs as a result of the optical element tilt. When these misalignments are large they are easily seen in the resultant image. Existing means for affixing optical filters and other types of optical elements require rigid mechanical fastening methods such as threaded collars or retaining features that offer each of replacement. One example is disclosed in U.S. Pat. No. 6,313,960.

Therefore, there is a need for improving retention and alignment of optical elements in filter wheels and other types of optical element holding devices. There is also a need for mitigating or eliminating problems caused by the clearance associated with the optical element receptacles of optical element holding devices, such as misalignment and attendant disadvantages.

SUMMARY

To address the foregoing problems, in whole or in part, and/or other problems that may have been observed by persons skilled in the art, the present disclosure provides methods, processes, systems, apparatus, instruments, and/or devices, as described by way of example in implementations set forth below.

According to one embodiment, an optical element holder for an optical instrument includes: a body comprising an optical input side, an optical output side, a thickness along a longitudinal axis between the optical input side and the optical output side, and a plurality of receptacles configured to retain respective optical elements and generally arranged in a transverse plane orthogonal to the longitudinal axis, wherein each receptacle is open to the optical input side and to the optical output side to define an optical path through the body parallel to the longitudinal axis; and a plurality of pusher components extending from the body, each pusher component comprising a spring member and at least one contact surface positioned to be biased by the spring member toward at least one of the receptacles and into contact with an optical element retained in the receptacle, wherein each pusher component is configured to apply a biasing force against at least one optical element retained in a respective one of the receptacles to retain the at least one optical element in an aligned position at which the at least one optical element is parallel to the transverse plane.

According to another embodiment, an optical instrument includes: a light detector; optics configured for establishing an optical path to the light detector; and an optical element holder according to any of the embodiments disclosed herein, wherein the optical element holder is configured for selectively moving each of the receptacles into the optical path.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

FIG. 3 is a schematic cross-sectional view of an example of an optical element holder according to some embodiments.

FIG. 4B is a cutaway perspective view of the optical element holder illustrated in FIG. 4A.

DETAILED DESCRIPTION

Figure 1:
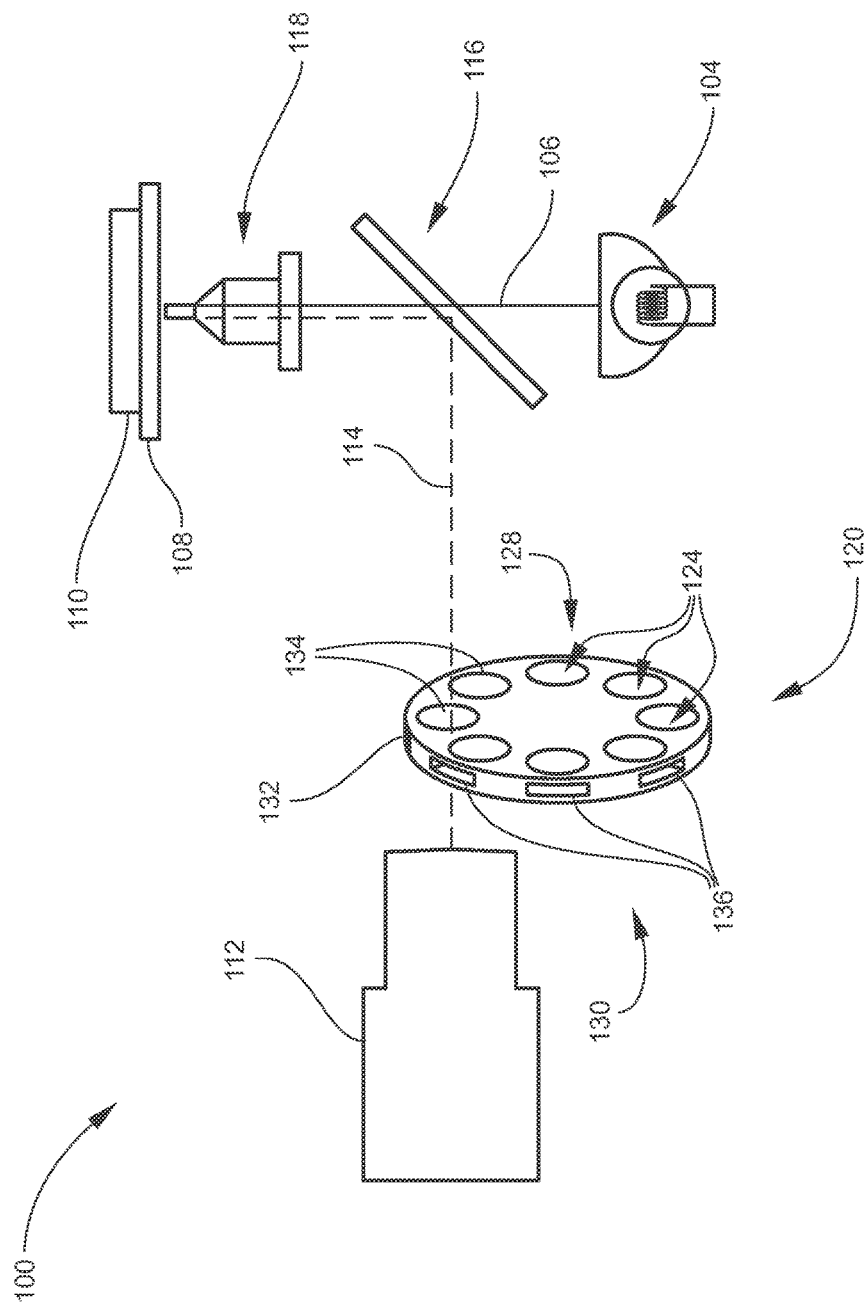
FIG. 1 is a schematic view of an example of an optical instrument according to some embodiments.

FIG. 1 is a schematic view of an example of an optical instrument (or optical system) 100 according to some embodiments. FIG. 1 may be considered as being generally representative of any optical instrument that provides one or more light paths and multiple optical elements, and enables selection of one or more the optical elements for positioning in a selected light path in a given application of the optical instrument. Specifically, FIG. 1 illustrates an example of a microscope (or microscope system) according to some embodiments. The microscope may be a confocal microscope, a wide-field microscope, or other type of microscope. Non-limiting examples of other types of optical instruments are noted above, such as devices that measure/detect various types of light, devices that acquire spectral data, etc. Generally, the structure and operation of various types of microscopes and other optical instruments are understood by persons skilled in the art, and thus certain components and features of the optical instrument 100 are described only briefly to facilitate an understanding of the subject matter taught herein.

The optical instrument 100 may generally include a light source 104 configured for generating excitation (illumination) light 106 for exciting (or illuminating) a sample 108 under analysis, a sample holder or stage 110 for supporting the sample 108, a light detector (or image sensor) 112 for collecting emission light 114 emitted from the sample 108 and thereby capturing an image of the sample 108, various optics for defining (i.e., establishing or providing) an excitation (or illumination) light path from the light source 104 to the sample 108, and various optics for defining an emission (or detection) light path from the sample 108 to the light detector 112. In confocal embodiments, the optics include one or more confocal devices such as, for example, a pinhole or spinning disk (not shown) positionable in an intermediate image plane and simultaneously in the excitation light path and the emission light path (or separate confocal devices may be separately positioned in the excitation light path and the emission light path). In some embodiments, the optical instrument 100 may be configured for detecting light reflected (scattered) from the sample 108 at the same wavelength as the light utilized to illuminate the sample 108. In other embodiments, the optical instrument 100 may be configured for exciting the sample 108 at a specific excitation wavelength and detecting fluorescent light emitted from the sample 108 at a longer wavelength in response to the excitation. In these latter embodiments, a fluorescent agent or fluorophore (e.g., fluoroscein) may be added to the sample 108 as appreciated by persons skilled in the art. For convenience, unless specified otherwise or the context dictates otherwise, the term "excitation" encompasses "illumination" of a sample 108 for the purpose of collecting light reflected or scattered from the sample 108, as well as excitation of a sample 108 for the purpose of collecting fluorescent emission light emitted by the sample 108. Also for convenience, unless specified otherwise or the context dictates otherwise, the term "emission light" encompasses either reflected (or scattered) light or fluorescent emission light.

The sample stage 110 positions the sample 108 at a sample plane. The sample stage 110 may generally be any platform for supporting the sample 108, or the sample 108 and a substrate supporting the sample 108 (e.g., a glass slide or container), in a fixed position thereon. In some embodiments, the sample stage 110 may be movable by manual or motorized actuation. That is, the position of the sample stage 110 may be adjustable by the user along the x-axis, y-axis, and/or z-axis. In the present context, the z-axis is taken to be the optical axis that is orthogonal to the sample plane, and the x-axis and y-axis are taken to lie in the sample plane. The sample 108 may generally be any object for which imaging is desired and which is mountable to the sample stage 110. For example, the sample 108 may be biological (e.g., spores, fungi, molds, bacteria, viruses, biological cells or intracellular components, biologically derived particles such as skin cells, detritus, etc.) or non-biological (e.g., chemical compound, particulate matter, etc.).

The light source 104 may be any light source suitable for the type of microscopy (or other optics-based analysis) being implemented in a given embodiment. For example, the light source 104 may be a solid-state light source such as a light emitting diode (LED) or a solid-state laser, or alternatively may be a semiconductor-based laser (laser diode or LD). In some embodiments, the optical output of the light source 104 may be the tip of an optical fiber that is imaged onto (conjugate to) an intermediate image plane provided by optics and the sample plane where the sample 108 is positioned. In some embodiments, the light source 104 may include a plurality of light sources (e.g., multiple LEDs) that generate light at different wavelengths. Such wavelength-specific light sources may be mounted to a wavelength selector, such as a motorized wheel (not shown) that enables automatic (computerized) selection of the wavelength-specific light source and thus the wavelength of the excitation light 106 to be utilized in a given application.

The light detector 112 may be any imaging device suitable for the type of microscopy (or other optics-based analysis) being implemented in a given embodiment. For example, the light detector 112 may be the type of imaging device that forms the basis of cameras. In typical embodiments, the light detector 112 is a multi-pixel (or pixelated) imaging device such as, for example, a charge-coupled device (CCD) or an active-pixel sensor (APS) based on complementary metal-oxide-semiconductor (CMOS) technology. In some embodiments, the optical instrument 100 may include an eyepiece (not separately shown) to enable the user to view the sample, in which case appropriate optical components (e.g., beam splitter) are provided to split the emission light path so that the emission light 114 is directed to both the light detector 112 and the eyepiece. Thus, the light detector 112 in FIG. 1 may be considered as schematically representing an imaging device, or both an imaging device and an eyepiece. Alternatively, the light detector 112 may be a broadband light source that operates in conjunction with an excitation filter (not shown) that only allows the desired excitation wavelength of light to pass. In some embodiments, a plurality of different wavelength-specific excitation filters may be mounted to a wavelength selector (e.g., a motorized wheel) to enable selection of the excitation wavelength to be passed while blocking other wavelengths.

The intermediate optics (optical components) involved in defining the excitation light path and/or emission light path may vary widely from one embodiment to another. Depending on the particular optical component, defining a light path may include modifying the light beam in some fashion, such as focusing, inverting, splitting, or resizing the light beam, etc. As illustrated in FIG. 1, the optics may include a dichroic beam splitter or mirror 116 (also known as a dichroic filter). The beam splitter 116 is configured to transmit light at the wavelengths contemplated for the excitation light 106, and to reflect light at an angle (e.g., ninety degrees) at the wavelengths contemplated for the emission light 114. Alternatively, the beam splitter 116 may be and positioned to transmit the emission light 114 and to reflect the excitation light 106. In some embodiments, the beam splitter 116 may include a plurality of beam splitters having different optical reflection/transmission characteristics. Such beam splitters may be mounted to a wavelength selector, such as a motorized wheel (not shown) that enables automatic (computerized) selection of the beam splitter with the desired reflection/transmission spectrum. The optics may also include a microscope lensing system 118 that includes components such as an objective lens. Generally, the lensing system 118 is configured for transmitting and focusing the excitation light 106 onto the sample 108, and collecting the emission light 114 emitted from the sample 108 and focusing the emission light 114 onto the light detector 112. The optics may also include an optical element holder (or holding device) 120 discussed further below. Other examples of optics (not shown) may include, but are not limited to, one or more collimating lenses, relay lenses, field lenses, tube lenses, windows, etc., as appreciated by persons skilled in the art.

Generally, the optical element holder 120 is configured for securely retaining a plurality of optical elements 124, and is movable to enable selection of a desired optical element 124 for use in a given experiment. In typical embodiments, the optical elements 124 are disk-shaped but alternatively may be polygonal. In the illustrated example, the optical elements 124 are emission filters having different transmission characteristics (i.e., colors). The optical filters function to block unwanted wavelengths and thereby prevent them from reaching the light detector 112. As such, the optical element holder 120 functions as a wavelength selector in the illustrated example. In typical embodiments the optical element holder 120 is rotatable about a central axis to enable wavelength selection, in which case the optical element holder 120 may be a wheel or carousel. In other embodiments the optical element holder 120 may effect a different type of movement, such as linear sliding as noted above. Movement of the optical element holder 120 may be motorized and automated (computerized) in a manner appreciated by persons skilled in the art. As shown in FIG. 1, during operation the optical element holder 120 positions a selected optical element 124 in an operative position at which the selected optical element 124 is optically aligned with the path of the emission light 114, whereby the emission light 114 is incident on, and modified (e.g., filtered) by, the selected optical element 124 prior to reaching the light detector 112.

The optical element holder 120 may be generally disk-shaped or have another type of planar geometry. Thus, the optical element holder 120 may have two opposing sides dictating the dominant planar dimensions (two-dimensional size) of the optical element 124 and a thickness between the two opposing sides. One of the two opposing sides is an optical input side 128 at which the emission light 114 is received from the sample 108 (and any intervening optics), and the other side is an optical output side 130 from which the modified (e.g., filtered) emission light 114 propagates toward the light detector 112 (and any intervening optics). The thickness of the optical element holder 120 may be defined generally along (parallel to) the optical axis of the emission light 114 that is transmitted through the optical element holder 120 from the optical input side 128 to the optical output side 130.

The optical element holder 120 may generally include a body 132 on or in which the optical elements 124 are retained. The body 132 may be monolithic or an assembly of two or more components. The body 132 includes openings 134 aligned with the respective optical elements 124 to enable light to reach the optical elements 124. Similar openings are provided on the opposite side (not shown) of the body 132. One or more surfaces of the body 132 may define optical element receptacles (not shown), examples of which are described further below, in which respective optical elements 124 are loaded. The optical element receptacles may be configured to define fixed, repeatable operating positions of the respective optical elements 124 at which the optical elements 124 are securely retained. In the illustrated disk- or wheel-type embodiment, the optical element receptacles (and the optical elements 124 loaded therein) are positioned at a radial distance from the central axis of rotation of the optical element holder 120, and are circumferentially spaced from each other about the central axis. In some embodiments, the optical element receptacles may be configured as radial slots that include radial openings or grooves 136 through which the optical elements 124 are loaded into and removed from the body 132. In other embodiments, the body 132 may include other means for loading and removing the optical elements 124.

In the illustrated example of FIG. 1, the optical element holder 120 just described is positioned in the emission light path and thus serves as an emission filter holder. Alternatively, the optical element holder 120 may be an excitation filter holder that is positioned in the excitation light path. As a further alternative, an optical filter holder may be positioned in the emission light path to serve as an emission filter holder (as specifically illustrated in FIG. 1), and another optical filter holder (not specifically shown) may be positioned in the excitation light path to serve as an excitation filter holder. Moreover, in other embodiments the optical instrument 100 may provide a single light path such as an emission light path. As one non-limiting example, the optical instrument 100 may be a luminometer that measures luminescent light emitted from the sample 108 as a result of chemical or biological activity, i.e., without requiring stimulation by excitation light.

Moreover, in the context of the present disclosure, the term "optical element" or "optics element" refers to any type of component or device configured for modifying light incident on that component or device. The modification effected by the optical element may be, for example, filtering, blocking (i.e., 100% blocking as opposed to wavelength-dependent filtering), collimating, focusing, inverting, beam steering, beam splitting, attenuating, etc. Optical element holders as described herein may support any of these different types of optical elements, and in some embodiments a combination of two or more different types of optical elements. For example, the optical elements 124 mounted to the optical element holder 120 in a given application may simultaneously include filters and also one or more lenses, such as a phase alignment lens.

It will also be understood that FIG. 1 is a high-level schematic depiction of an example of the optical instrument 100 consistent with the present disclosure. Other optics, electronics, and mechanical components and structures not specifically shown in FIG. 1 may be included as needed for practical implementations. As one example, the optical instrument 100 may also include a computing device (not shown) communicating with the light detector 112. The computing device may receive images captured by the light detector 112 or measurement data outputted by the light detector 112, and digitize, record and/or otherwise process the images or measurement data. The computing device may also process captured images or acquired measurement data as needed for displaying the images or measurement data on a display device such as a computer screen. The computing device may also be configured for processing the images so as to enhance or control the display of the images in a desired manner. The computing device may also communicate with the optical element holder 120 so as to control its movement, such as to index a selected optical element 124 into an optical path. Generally for these purposes, the computing device may include hardware (microprocessor, memory, etc.) and software components, as well as user interface (both input and output) devices, as appreciated by persons skilled in the art.

Figure 2:
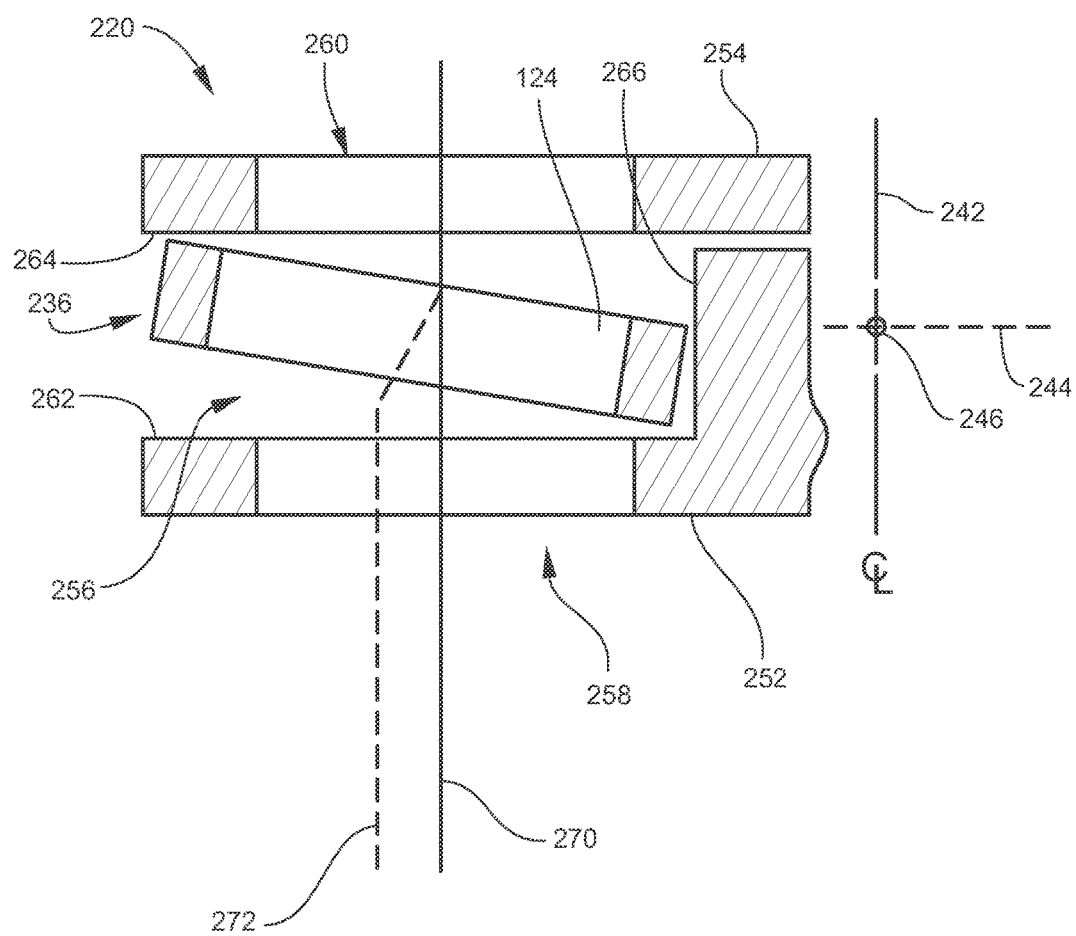
FIG. 2 is a schematic cross-sectional view of a portion of a conventional optical element holder at which an optical element is positioned.

FIG. 2 is a schematic cross-sectional view of a portion of a conventional optical element holder 220 at which one of the optical elements 124 is positioned. As described above, the optical element holder 220 may be an emission filter holder as illustrated in FIG. 1, or may be an excitation filter holder, or may hold optical elements 124 of another type. For reference purposes, FIG. 2 shows a longitudinal (or central) axis 242 and a transverse (or radial) axis 244 orthogonal to the central axis 242. In the illustrated disk- or wheel-type embodiment, the longitudinal axis 242 is the central axis (i.e., the axis of rotation) of the optical element holder 220. The transverse axis 244 lies in a transverse plane orthogonal to the central axis 242. The transverse plane may be defined by rotating the illustrated transverse axis 244 about the central axis 242, or by considering the transverse axis 244 in conjunction with another transverse axis 246 (directed into and out of the drawing sheet) that is orthogonal to the transverse axis 244 and to the central axis 242. In this example, the body of the optical element holder 220 includes a first body portion 252 and a second body portion 254 between which an optical element receptacle 256 is located. The optical element receptacle 256 includes, or is in open communication with, a radial opening 236. Thus, in the present embodiment, the optical element 124 is loaded into the optical element receptacle 256 via the radial opening 236 generally along the radial direction. Respective openings 258 and 260 of the first body portion 252 and the second body portion 254 are optically aligned with each other and with the optical element 124, thereby enabling a light path to be established through the optical element holder 220 including through the optical element 124. Either side of the optical element holder 220 (the top side or the bottom side, from the perspective of FIG. 2), may serve as the optical input side while the other opposing side serves as the optical output side. The body of the optical element holder 220 (including the first body portion 252 and second body portion 254) has a thickness along (in a direction parallel to) the central axis 242.

The body of the optical element holder 220 includes a plurality of distinct surfaces. Each optical element receptacle 256 (and associated radial opening 236) may be defined by at least one of the surfaces of the optical element holder body. In some embodiments, these surfaces may include a (first) transverse receptacle surface 262 of the first body portion 252, a (second) transverse receptacle surface 264 of the second body portion 254 generally facing the first transverse receptacle surface 262, and a longitudinal receptacle surface 266 extending between the first transverse receptacle surface 262 and the second transverse receptacle surface 264. One or more of these surfaces 262, 264, and 266 may be adjoined to one or more of the other surfaces 262, 264, and 266. In the present context, the first transverse receptacle surface 262 and the second transverse receptacle surface 264 are "transverse" in that they generally extend along the transverse or radial axis 244 and thus are coplanar with the transverse plane orthogonal to the central axis 242 (the plane that is defined in one direction by the illustrated transverse or radial axis 244). Similarly, the longitudinal receptacle surface 266 is "longitudinal" in that it generally extends along the central axis 242, although the longitudinal receptacle surface 266 may include local structural features that are not be perfectly parallel with the central axis 242.

As described above, in an ideal case the optical element holder 220 (in particular, the optical element receptacle 256 and surrounding body portions 252 and 254) retains the optical element 124 in perfect alignment with the optical path, such that the light beam (e.g., an emission light beam, excitation light beam, etc., depending on how the optical element holder 220 is being utilized) follows a straight path (e.g., is not turned or shifted) through the optical element holder 220 including while the light beam passes through the thickness of the optical element 124. FIG. 2 shows an ideal (or desired) light beam 270. In some embodiments, the ideal case may correspond to the optical element 124 being oriented (lying) in the transverse plane. However, in practice the optical element receptacle 256 has a clearance to facilitate inserting the optical element 124 into its proper operating position in optical element receptacle 256. This clearance may correspond to the open space between the optical element 124 and the surface(s) of the optical element holder 220 defining the boundaries of the optical element receptacle 256, such as the first transverse receptacle surface 262, the second transverse receptacle surface 264, and the longitudinal receptacle surface 266 in the illustrated example. This clearance may allow the optical element 124 to be inadvertently loaded with an angular tilt (e.g., relative to the transverse plane), which results in a shifted light beam 272 as shown in FIG. 2. Additionally, operational vibration may cause the optical elements 124 to shift or tilt over time. This misalignment may result in "pixel shift" as described above and/or cause other problems. Accordingly, to mitigate or eliminate this pixel shift the clearance in the optical element holder 220 should be mitigated or eliminated or otherwise addressed.

FIG. 3 is a schematic cross-sectional view of an example of an optical element holder 320 according to some embodiments. Similar of the view of FIG. 2, FIG. 3 illustrates a portion of the optical element holder 320 where one of the optical elements 124 is positioned. As described above, the optical element holder 320 may be an emission filter holder as illustrated in FIG. 1, or may be an excitation filter holder, or may hold optical elements 124 of another type. As a frame of reference, FIG. 3 also shows a longitudinal or central axis 342 of the optical element holder 320 and a transverse or radial axis 344 orthogonal to the central axis 342. The body of the optical element holder 320 includes a first body portion 352 and a second body portion 354 between which a plurality of optical element receptacles 356 are located, one of which is shown in FIG. 3. In the present embodiment, the optical element 124 is loaded into the optical element receptacle 356 generally along the radial direction via a radial opening 336. The first body portion 352 and the second body portion 354 include respective openings 358 and 360 aligned with each optical element receptacle 356, which enable a light path to be established through the optical element 124 when the optical element 124 is moved (e.g., rotated in the present embodiment) to the operative position shown in FIG. 1. Each optical element receptacle 356 (and associated radial opening 336) may be defined by one or more surfaces of the optical element holder body. In some embodiments, these surfaces may include a (first) transverse receptacle surface 362 (which is perpendicular to the central axis 242) of the first body portion 352, a (second) transverse receptacle surface 364 of the second body portion 354 generally facing the first transverse receptacle surface 362, and a longitudinal receptacle surface 366 extending between the first transverse receptacle surface 362 and the second transverse receptacle surface 364.

To address the problem of optical element misalignment, the optical element holder 320 includes a plurality of pusher components 374 positioned at the respective optical element receptacles 356, one pusher component 374 and associated optical element receptacle 356 being shown in FIG. 3. Depending on the embodiment, one or more pusher components 374 may be positioned at each optical element receptacle 356. That is, the optical element holder 320 may be configured for single-point or multi-point (e.g., dual-point) biasing at each optical element receptacle 356. Generally, each pusher component 374 is configured for pushing or biasing (applying a pushing or biasing force 376 to) the corresponding optical element 124 in a manner effective to retain the optical element 124 in an aligned position in the optical element receptacle 356 at which the optical element 124 is generally parallel to the transverse plane, i.e., is not shifted or tilted. To achieve this retained alignment, in some embodiments each pusher component 374 may be configured for applying the biasing force 376 to the corresponding optical element 124 at an angle to both axes of the optical element holder 320, i.e., at an angle to the central axis 342 and to the transverse or radial axis 344, such that the optical element 124 is forced or biased into contact with (i.e., the optical element 124 bears against) at least one surface of the optical element holder 320. The pushing or biasing force 376 thus has a force component in a direction along the central axis 342 and a force component in a direction along the transverse or radial axis 344. The pusher component 374 is positioned so as to contact the optical element 124, and thereby apply the force to the optical element 124, at some point while the optical element 124 is inserted into the optical element receptacle 356. The surface with which the optical element 124 is forced into contact is one or more surfaces defining the optical element receptacle 356, and thus may be the first transverse receptacle surface 362, the second transverse receptacle surface 364, and/or the longitudinal receptacle surface 366.

Generally, the pusher component 374 may be structured, oriented, and positioned in any manner effective for applying the angled pushing or biasing force 376. In the illustrated embodiment, the pusher component 374 includes a contact surface 378 for contacting the optical element 124 and a spring member 380 (schematically depicted in FIG. 3) capable of storing potential energy and applying the angled pushing or biasing force 376. The contact surface 378 may be curved, for example spherical or conical (e.g. parabolic, hyperbolic, etc.), or may be a flat surface that is angled (e.g., 45 degrees to the central axis 342 and to the transverse axis 344) to provide a biasing force at a desired angle. The contact surface 378 may be attached or integrally adjoined to the spring member 380, or may be a separate component with which the spring member 380 contacts. The spring member 380 may be a spring element distinct from a main structural portion of the pusher component 374, or may be a deflectable structural portion of the pusher component 374. In some embodiments, the spring member 380 may be a planar structure having an elongated (or dominant) dimension and is deflectable in a direction generally orthogonal to the elongated dimension. For example, the spring member 380 may be a flat spring, such as a strip of material having opposing planar surfaces defined by a length and a width, and a thickness between the opposing planar surfaces. The length may be greater than the width and the thickness and thus may be the elongated (or dominant) dimension. In this case, the strip of material is deflectable in a direction generally orthogonal to its length. For example, the strip of material may be mounted as a cantilever, or otherwise has at least one free (unconstrained) end at which the strip of material is deflectable. In some embodiments, the entire solid structure of the pusher component 374 is deflectable and thus functions as the spring member 380. The pusher component 374 may be an integral part of the body of the optical element holder 320, or may be attached, fastened, or otherwise mechanically referenced to the optical element holder body as needed for effectively applying the angled pushing or biasing force 376. In some embodiments, two or more contact surfaces 378 may be positioned at each optical element receptacle 356. In such embodiments, all of the contact surfaces 378 may be located on the same side of the optical element 124 (i.e., the upper side or lower side, from the perspective of FIG. 3), or some contact surfaces 378 may be located on the opposite sides of the optical element 124.

In operation, as each optical element 124 is loaded into a corresponding optical element receptacle 356, the optical element 124 comes into contact with the contact surface 378 of the pusher component 374. To facilitate loading, the optical element 124 may be gripped and handled by any suitable technique as appreciated by persons skilled in the art. The optical element 124 may slide along the contact surface 378 for a small distance (and against the biasing force imparted by the pusher component 374) before being urged by the pusher component 374 into its final operative position (also referred to herein as the aligned position) in the optical element receptacle 356. The pusher component 374 is configured, and positioned relative to the optical element receptacle 356, such that the final operative position of the optical element 124 in the optical element receptacle 356 is a distinct, repeatable position that does not vary from one iteration of loading and removing the optical element 124 to another iteration. Moreover, at the operative position, the optical element 124 is securely retained and properly aligned with the correct optical path through the optical element holder 320, consequently resulting in a properly aligned light beam 370. Subsequently, the optical element 124 may be removed by any suitable technique in which the optical element 124 is able to be grasped and moved out from the optical element receptacle 356 while overcoming the biasing force imparted by the pusher component 374.

FIG. 3 also illustrates an additional embodiment in which the optical element holder 320 further includes a retaining or cornering feature 382. Generally, the cornering feature 382 is positioned such that the optical element 124 contacts the cornering feature 382 at the final operative position. Generally, the cornering feature 382 is configured to apply a reaction force 384 to the optical element 124 in response the optical element 124 contacting the cornering feature 382. The reaction force 384 is oriented such that the reaction force 384 pushes the optical element 124 against a desired surface of the optical element holder 320, thereby assisting or supplementing the operation of the pusher component 374 in ensuring proper alignment of the optical element 124 (i.e., minimizing angular tilt of the optical element 124). The reaction force 384 has a force component in a direction along the central axis 342 and a force component in a direction along the transverse or radial axis 344. The directions of the respective force components of the reaction force 384 along the central axis 342 and along the transverse or radial axis 344 may be opposite to the corresponding force components of the biasing force 376 applied by the pusher component 374. For example, the resultant reaction force 384 may be oriented at an angle to both the central axis 342 and to the transverse or radial axis 344 that is complementary or substantially complementary to (shifted by or about ninety degrees from) the angle of the pushing or biasing force 376. In some embodiments, the cornering feature 382 is an angled section of one of the surfaces of the optical element holder 320. For example, in the illustrated embodiment the cornering feature 382 is an angled section of the longitudinal receptacle surface 366. In some embodiments, the pusher component 374 and the cornering feature 382 cooperate to bias the optical element 124 into contact with a single surface or side of the optical element receptacle 356. For example, in the illustrated embodiment the optical element 124 in its operative (aligned) position is biased into contact with the first transverse receptacle surface 362, which is perpendicular to the central axis 342.

Figure 4A:
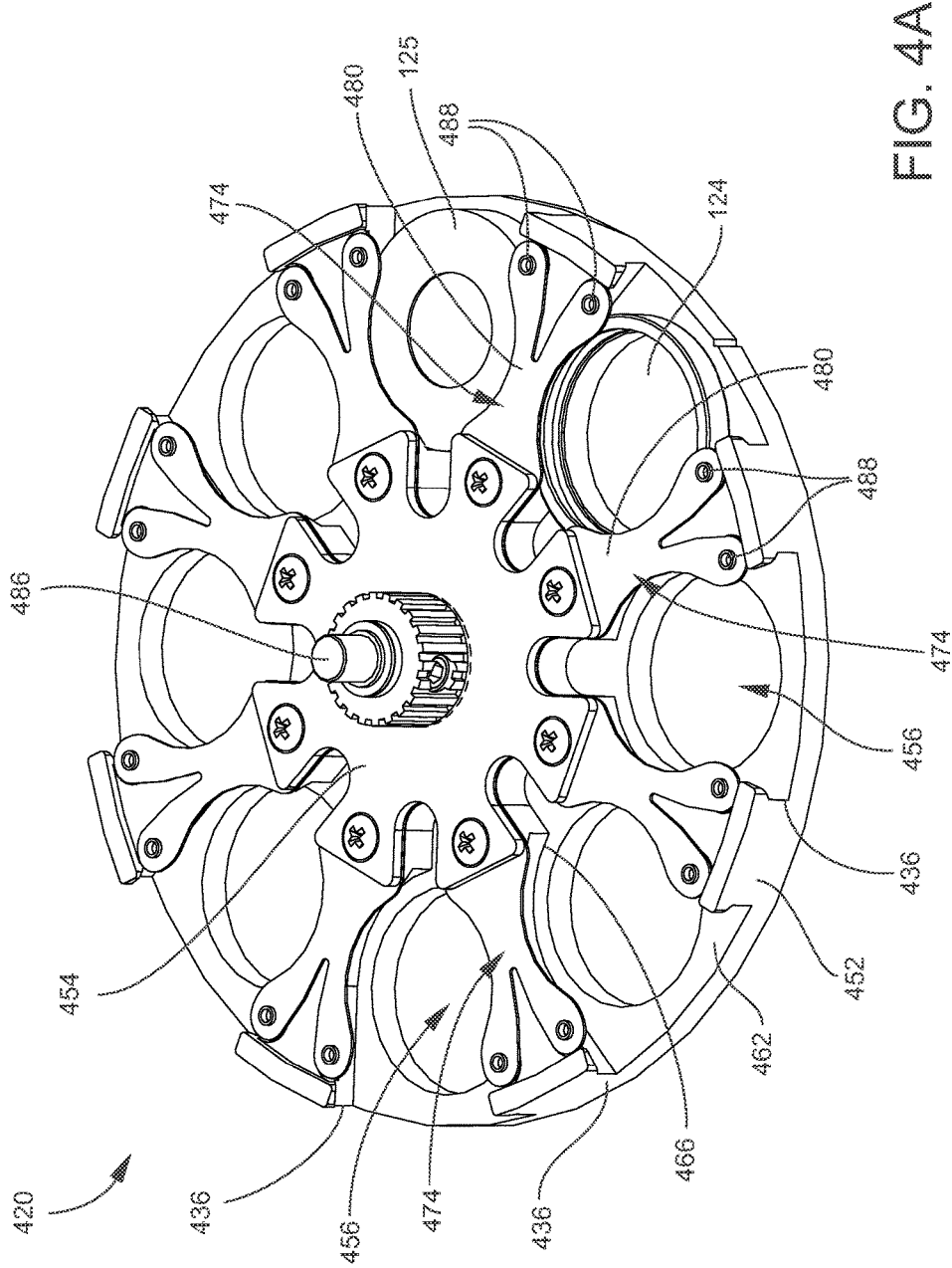
FIG. 4A is a perspective view of an example of an optical element holder according to another embodiment.

FIG. 4A is a perspective view of an example of an optical element holder 420 according to another embodiment. FIG. 4B is a cutaway perspective view of the optical element holder 420. Specifically, a portion of the optical element holder 420 in FIG. 4B is cut away along a plane parallel with the central axis and orthogonal to the transverse (or radial) axis, which axes are defined above and illustrated in FIGS. 2 and 3. FIGS. 4A and 4B also illustrate an optical element 124 loaded in the optical element holder 420. FIGS. 4A and 4B further illustrate an example of a different type of optical element 125 loaded in the optical element holder 420. For instance, the optical element 124 may be a filter and the other optical element 125 may be a lens such as a phase alignment lens. In the illustrated embodiment, the optical element holder 420 is configured as a disk or wheel that can be rotated about its central axis to select an optical element 124 for use in a given experiment. Thus, the optical element holder 420 may include a centrally located coupling 486 configured to be coupled to a motor to drive rotation of the optical element holder 420 about the central axis. In the illustrated example, the coupling 486 includes a shaft and a belt drive pulley that may be operatively linked to a suitable motor.

The body of the optical element holder 420 includes a plurality of optical element receptacles 456 for holding a like number of optical elements 124. Eight optical element receptacles 456 are shown by example only, with the understanding that more or less than eight optical element receptacles 456 may be provided. The optical element receptacles 456 are each positioned at a radial distance from the central axis, and are circumferentially spaced from each other about the central axis. In the present embodiment, the optical element holder 420 is configured for radial loading of the optical elements 124, and thus includes radial openings 436 leading into the respective optical element receptacles 456. Also in present embodiment, the optical element holder body includes a first body portion 452 and a second body portion 454. In this embodiment, the first body portion 446 is the structure that primarily defines or forms the optical element receptacles 456, including the radial openings 436 and the openings at the optical input side and the optical output side, i.e., the openings communicating with the optical element receptacles 456 that enable a light path to be established through a selected optical element 124 (e.g., openings 358 and 360 shown in FIG. 3). The optical element holder 420 further includes a plurality of pusher components 474. The boundaries of the optical element receptacles 456 (or the optical element receptacles 456 and the radial openings 436) may be at least partially defined by the pusher components 474. In this embodiment, the pusher components 474 generally extend outward in radial directions from the central axis. The pusher components 474 may be considered as being radial extensions of the second body portion 454. In the illustrated example, the pusher components 474 are fastened to the second body portion 454 by screws. In other embodiments, however, the pusher components 474 may be attached to the second body portion 454 by other means, or may be integral parts of the second body portion 454.

As described above, the pusher components 474 are provided to address the problem of optical element misalignment. Each pusher component 474 may be configured for pushing or biasing the corresponding optical element 124 at an angle to both axes of the optical element holder 420, i.e., at an angle to the central axis and to the transverse (or radial) axis, such that the optical element 124 is forced or biased into contact with (i.e., the optical element 124 bears against) at least one surface of the optical element holder 420 such as a surface of the optical element receptacle 456. The pushing or biasing force thus has a force component in a direction along the central axis and a force component in a direction along the transverse axis. The pusher component 474 is positioned so as to contact the optical element 124, and thereby apply the biasing force to the optical element 124, at some point while the optical element 124 is inserted into the optical element receptacle 456. In the present embodiment, each pusher component 474 includes a spring member 480 and at least two contact elements 488 extending from the spring member 480. The spring member 480 in this embodiment is a deflectable structure capable of storing potential energy and applying the angled pushing or biasing force. The contact elements 488 may be integrally formed with the spring member 480 or may be attached to the spring member 480 such as by fastening, bonding, welding, brazing, riveting, etc.

In some embodiments and as illustrated, each spring member 480 may include two arms that terminate at ends spaced apart from each other, and each contact element 488 may be positioned at the end of one of the arms. By this configuration, the two arms of each spring member 480 are individually deflectable, and the contact elements 488 are independently movable. Each pusher component 474, and thus each spring member 480, is positioned between two adjacent optical element receptacles 456. By this configuration, two contact elements 488 are associated with each optical element receptacle 456. Thus, the present embodiment is an example of dual-point biasing of each optical element 124 mounted to the optical element holder 420. The contact elements 488 associated with each optical element receptacle 456 are spaced from each other so as to be positioned generally on opposing sides of the perimeter of the optical element 124. In the present context, "opposing sides" refers to two sides (or halves) of the optical element 124 demarcated by a diametrical line that is located between the two contact elements 488, resulting in one contact element 488 being positioned on one side of that diametrical line and the other contact element 488 being positioned on the other side of that diametrical line. Hence, as shown, the two contact elements 488 do not need to be positioned diametrically opposite to each other relative to the corresponding optical element 124, but more generally are circumferentially spaced from each other relative to the optical element 124 by some arc length along the perimeter of the optical element 124.

As best shown in FIG. 4B, each contact element 488 includes an outer contact surface 478 for contacting the optical element 124. The contact surface 478 may be rounded or curved so as to facilitate sliding contact with the optical element 124 as the optical element 124 is moved into and out from the optical element receptacle 456, and to minimize the contact area between the contact surface 478 and the optical element 124. For example, the contact surface 478 may be generally spherical, conical, or the like. The contact surfaces 478 associated with each optical element receptacle 456 are positioned generally on "opposing sides" of the perimeter of the optical element 124, and both contact surfaces 478 apply an angled biasing force to the optical element 124. Each angled biasing force has a force component in a direction along the central axis and a force component in a direction along the transverse (or radial) axis. Due to the contact surfaces 478 being at different locations, the angle (or orientation) of the resultant biasing forces of the respective contact surfaces 478 are different. The magnitudes of the two biasing forces may be the same or substantially the same. Consequently, the two pusher components 474 associated with each optical element receptacle 456 cooperate to bias the optical element 124 into contact with at least one surface of the optical element holder 420, such as a transverse surface 462 (or both the transverse surface 462 and a longitudinal surface 466) of the first body portion 452 (FIG. 4A).

Figure 4C:
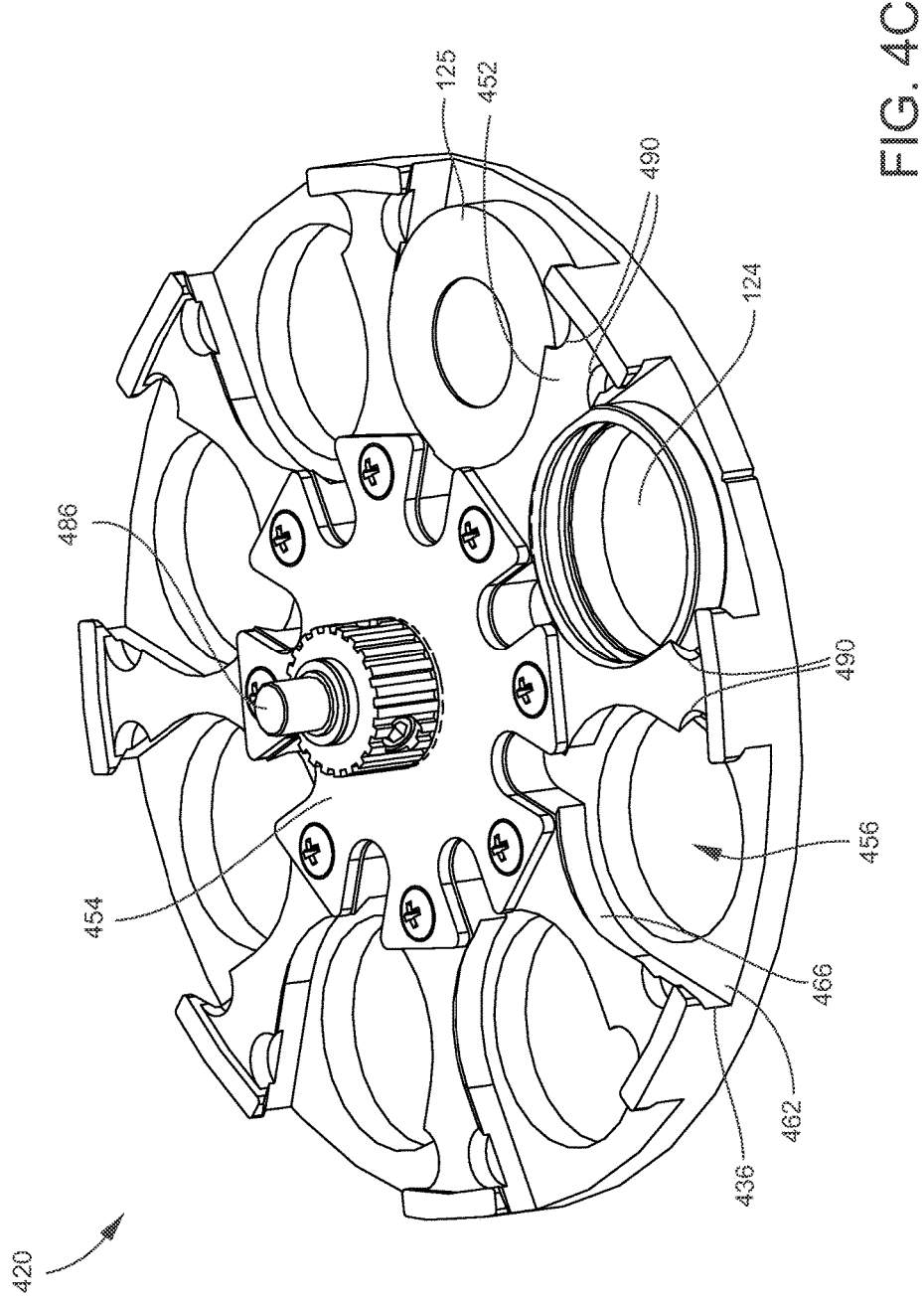
FIG. 4C is a perspective view of the optical element holder illustrated in FIGS. 4A and 4B, with pusher components of the optical element holder removed.

FIG. 4C is a perspective view of the optical element holder 420 with the pusher components 474 removed. As shown, surfaces of the optical element holder body facing the optical element receptacles 456, such as surfaces of the first body portion 452, may include recesses or pockets 490 that are sized, shaped, and positioned to accommodate the presence and movement of the contact elements 488.

The operation of the optical element holder 420 may be similar to that described above in conjunction with FIG. 3. Each optical element 124 is loaded into one of the optical element receptacles 456 generally along the radial direction. As each optical element 124 is loaded, the optical element 124 comes into contact with the contact surfaces 478 of the contact elements 488 positioned at the corresponding optical element receptacle 456 (two contact elements 488 per optical element receptacle 456 in the illustrated example). The optical element 124 may slide along the contact surfaces 478 for a small distance (and against the biasing force imparted by the pusher components 474) before being urged by the pusher components 474 (via contact with the contact surfaces 478) into its final operative position in the optical element receptacle 456. As in other embodiments disclosed herein, the pusher components 474 (particularly the contact elements 488) are configured, and positioned relative to the optical element receptacle 456, such that the final operative position of the optical element 124 in the optical element receptacle 456 is a distinct, repeatable position that does not vary from one iteration of loading and removing the optical element 124 to another iteration. Moreover, at the operative position, the optical element 124 is securely retained and properly aligned with the correct optical path through the optical element holder 420, consequently resulting in a properly aligned light beam through the selected optical element 124. Subsequently, the optical element 124 may be removed by any suitable technique.

Figure 5A:
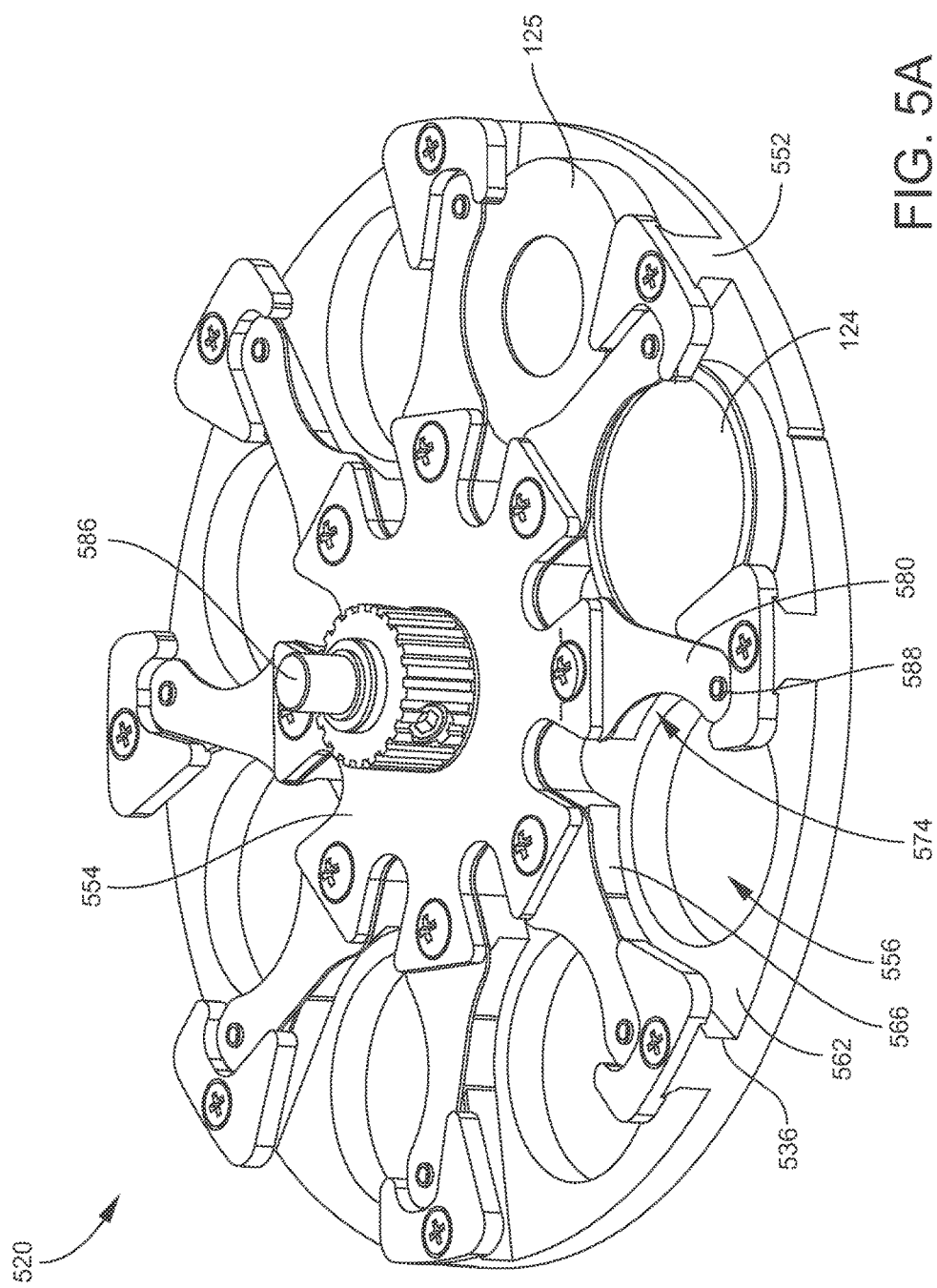
FIG. 5A is a perspective view of an example of an optical element holder according to another embodiment.

FIG. 5A is a perspective view of an example of an optical element holder 520 according to another embodiment. FIG.

Figure 5B:
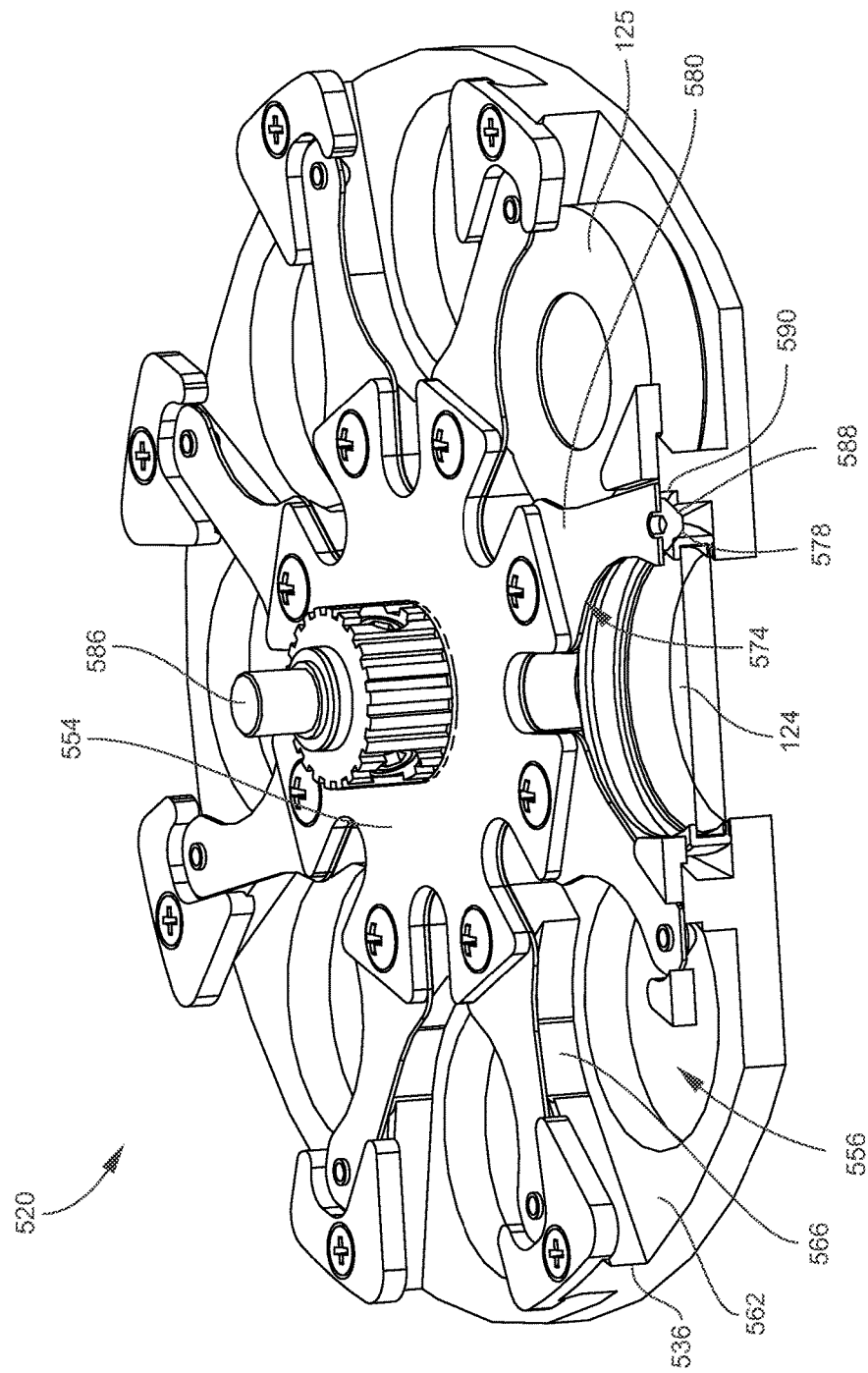
FIG. 5B is a cutaway perspective view of the optical element holder illustrated in FIG. 5A, in which a portion of the optical element holder is cut away along a plane similar to that shown in FIG. 4B.

5B is a cutaway perspective view of the optical element holder 520, in which a portion of the optical element holder 520 is cut away along a plane similar to that shown in FIG. 4B. Specifically, along a plane parallel with the central axis and orthogonal to the transverse (or radial) axis, which axes are defined above and illustrated in FIGS. 2 and 3. FIGS. 5A and 5B also illustrate an optical element 124 loaded in the optical element holder 520. FIGS. 5A and 5B further illustrate an example of a different type of optical element 125 loaded in the optical element holder 420. For instance, the optical element 124 may be a filter and the other optical element 125 may be a lens such as a phase alignment lens. As in the embodiment described above and illustrated in FIGS. 4A to 4C, the optical element holder 520 is configured as a disk or wheel that can be rotated about its central axis to select an optical element 124 for use in a given experiment.

The optical element holder 520 may include many of the same or similar components as those described above and illustrated in FIGS. 4A to 4C. Thus, the optical element holder 520 may include a centrally located coupling 586. The body of the optical element holder 520 includes a plurality of optical element receptacles 556 for holding a like number of optical elements 124. The optical element receptacles 556 are each positioned at a radial distance from the central axis, and are circumferentially spaced from each other about the central axis. The optical element holder 520 includes radial openings 536 leading into the respective optical element receptacles 556. The body of the optical element holder 520 includes a first body portion 552 and a second body portion 554. The first body portion 446 may be the structure that primarily defines or forms the optical element receptacles 556, including the radial openings 536 and the openings at the optical input side and the optical output side. The optical element holder 520 further includes a plurality of pusher components 574, which may at least partially define the boundaries of the optical element receptacles 556 (or the optical element receptacles 556 and the radial openings 536). The pusher components 574 generally extend outward in radial directions from the central axis, and may be attached to the second body portion 554 or may be integral parts of the second body portion 554.

As in other embodiments, the pusher components 574 function to retain the optical elements 124 in fixed, repeatable operating (or aligned) positions in the respective optical element receptacles 556, such that each optical element 124 when moved into the optical path is correctly aligned with the optical path. For this purpose, each pusher component 574 may be configured for pushing or biasing the corresponding optical element 124 at an angle to both axes of the optical element holder 520, i.e., at an angle to the central axis and to the transverse (or radial) axis (as defined above), such that the optical element 124 is forced or biased into contact with (i.e., the optical element 124 bears against) at least one surface of the optical element holder 520 such as a surface of the optical element receptacle 556. The pusher component 574 is positioned so as to contact the optical element 124, and thereby apply the biasing force to the optical element 124, at some point while the optical element 124 is inserted into the optical element receptacle 556. Each pusher component 574 includes a spring member 580 (e.g., a deflectable structure) and a contact element 588 extending from the spring member 580. Surfaces of the optical element holder body facing the optical element receptacles 556, such as surfaces of the first body portion 552, may include recesses or pockets 590 that are sized, shaped, and positioned to accommodate the presence and movement of the contact elements 588.

Each pusher component 574, and thus each spring member 580, is generally positioned between two adjacent optical element receptacles 556. However, the contact element 588 extending from the spring member 580 of each pusher component 574 is positioned such that the contact element 588 extends into (or is present in) only one optical element receptacle 556. Thus, in this embodiment only one pusher component 574 (and only one spring member 580 and corresponding contact element 588 of that pusher component 574) is associated with each optical element receptacle 556. The present embodiment is thus an example of single-point biasing of each optical element 124 mounted to the optical element holder 520. As best shown in FIG. 5B, each contact element 588 includes an outer contact surface 578 for contacting the optical element 124. As described above, the contact surface 578 applies an angled biasing force to the optical element 124 that has a force component in a direction along the central axis and a force component in a direction along the transverse (or radial) axis. Consequently, the pusher component 574 associated with each optical element receptacle 556 biases the optical element 124 into contact with at least one surface of the optical element holder 520, such as a transverse surface 562 (or both the transverse surface 562 and a longitudinal surface 566) of the first body portion 552 (FIG. 5A).

Other than the single-point biasing, the operation of the optical element holder 520 may be generally the same as that described above in conjunction with FIGS. 4A to 4C.

Figure 6:
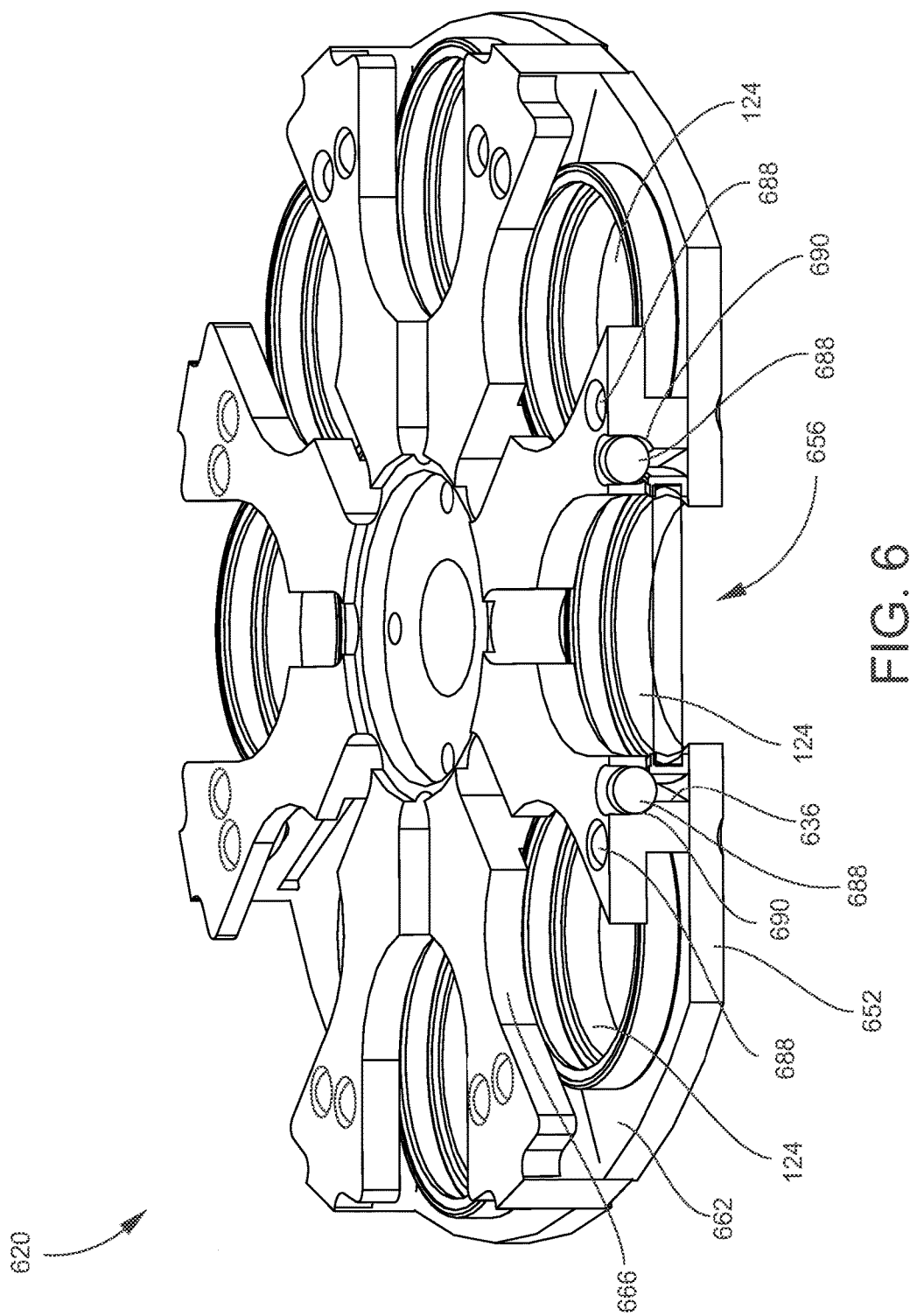
FIG. 6 is a cutaway perspective view of an example of an optical element holder according to another embodiment

FIG. 6 is a cutaway perspective view of an example of an optical element holder 620 according to another embodiment, in which a portion of the optical element holder 620 is cut away along a plane similar to that shown in FIGS. 4B and 5B. FIG. 6 also illustrates optical elements 124 loaded in respective optical element receptacles 656 of the optical element holder 620. As in other embodiments described above, the optical element holder 620 is configured as a disk or wheel that can be rotated about its central axis to select an optical element 124 for use in a given experiment.

The optical element holder 620 may include many of the same or similar components as those described above and illustrated in FIGS. 4A to 5B. Thus, the body of the optical element holder 620 includes a plurality of optical element receptacles 656 for holding a like number of optical elements 124. The optical element receptacles 656 are each positioned at a radial distance from the central axis, and are circumferentially spaced from each other about the central axis. The optical element holder 620 includes radial openings 636 leading into the respective optical element receptacles 656. The body of the optical element holder 620 includes at least a first body portion 652 that primarily defines or forms the optical element receptacles 656, including the radial openings 636 and the openings at the optical input side and the optical output side. The holder body may also include a second body portion (not shown), which may be similar to the second body portions described above and illustrated in FIGS. 4A to 5B. The optical element holder 620 further includes a plurality of pusher components, which may at least partially define the boundaries of the optical element receptacles 656 (or the optical element receptacles 656 and the radial openings 636). The pusher components (or portions thereof) may be configured generally as described above and illustrated in FIGS. 4A to 5B, and thus may generally extend outward in radial directions from the central axis, and may be attached to the second body portion or may be integral parts of the second body portion.

As in other embodiments, the pusher components function to retain the optical elements 124 in fixed, repeatable operating (or aligned) positions in the respective optical element receptacles 656, such that each optical element 124 when moved into the optical path is correctly aligned with the optical path. For this purpose, each pusher component may be configured for pushing or biasing the corresponding optical element 124 at an angle to both axes of the optical element holder 620, i.e., at an angle to the central axis and to the transverse (or radial) axis (as defined above), such that the optical element 124 is forced or biased into contact with (i.e., the optical element 124 bears against) at least one surface of the optical element holder 620 such as a surface of the optical element receptacle 656. The pusher component is positioned so as to contact the optical element 124, and thereby apply the biasing force to the optical element 124, at some point while the optical element 124 is inserted into the optical element receptacle 656. Each pusher component includes a spring member (e.g., a deflectable structure, not shown) and two or more contact elements 688 positioned to be biased by the spring member. The spring member may be configured generally as described above and illustrated in FIGS. 4A to 5B. Surfaces of the optical element holder body facing the optical element receptacles 656, such as surfaces of the first body portion 652, may include recesses or pockets 690 that are sized, shaped, and positioned to accommodate the presence and movement of the contact elements 688.

As described above and illustrated in FIGS. 4A and 4B, each spring member may include two arms that terminate at ends spaced apart from each other, and each contact element 688 may be positioned at the end of one of the arms. By this configuration, the two arms of each spring member are individually deflectable, and the contact elements 688 are independently movable. Each pusher component, and thus each spring member, is positioned between two adjacent optical element receptacles 656. By this configuration, two contact elements 688 are associated with each optical element receptacle 656. Thus, the present embodiment is an example of dual-point biasing of each optical element 124 mounted to the optical element holder 620. The contact elements 688 associated with each optical element receptacle 656 are spaced from each other so as to be positioned generally on "opposing sides" of the perimeter of the optical element 124, as described above. In the present embodiment, the contact elements 688 are shaped as balls or spheres, which may be attached or integrated with the spring members, or may be separate components contacted by the spring members. As described above, the contact element 688 applies an angled biasing force to the optical element 124 that has a force component in a direction along the central axis and a force component in a direction along the transverse (or radial) axis. Consequently, the pusher components associated with each optical element receptacle 656 bias the corresponding optical element 124 into contact with at least one surface of the optical element holder 620, such as a transverse surface 662 (or both the transverse surface 662 and a longitudinal surface 666) of the first body portion 652.

As an alternative to each spring member having two arms that terminate at ends where respective contact elements 688 are located, two spring members may be provided generally between each pair of adjacent receptacles 656. In this case, each spring member may terminate at an end at which at least one contact element 688 is located.

Figure 7:
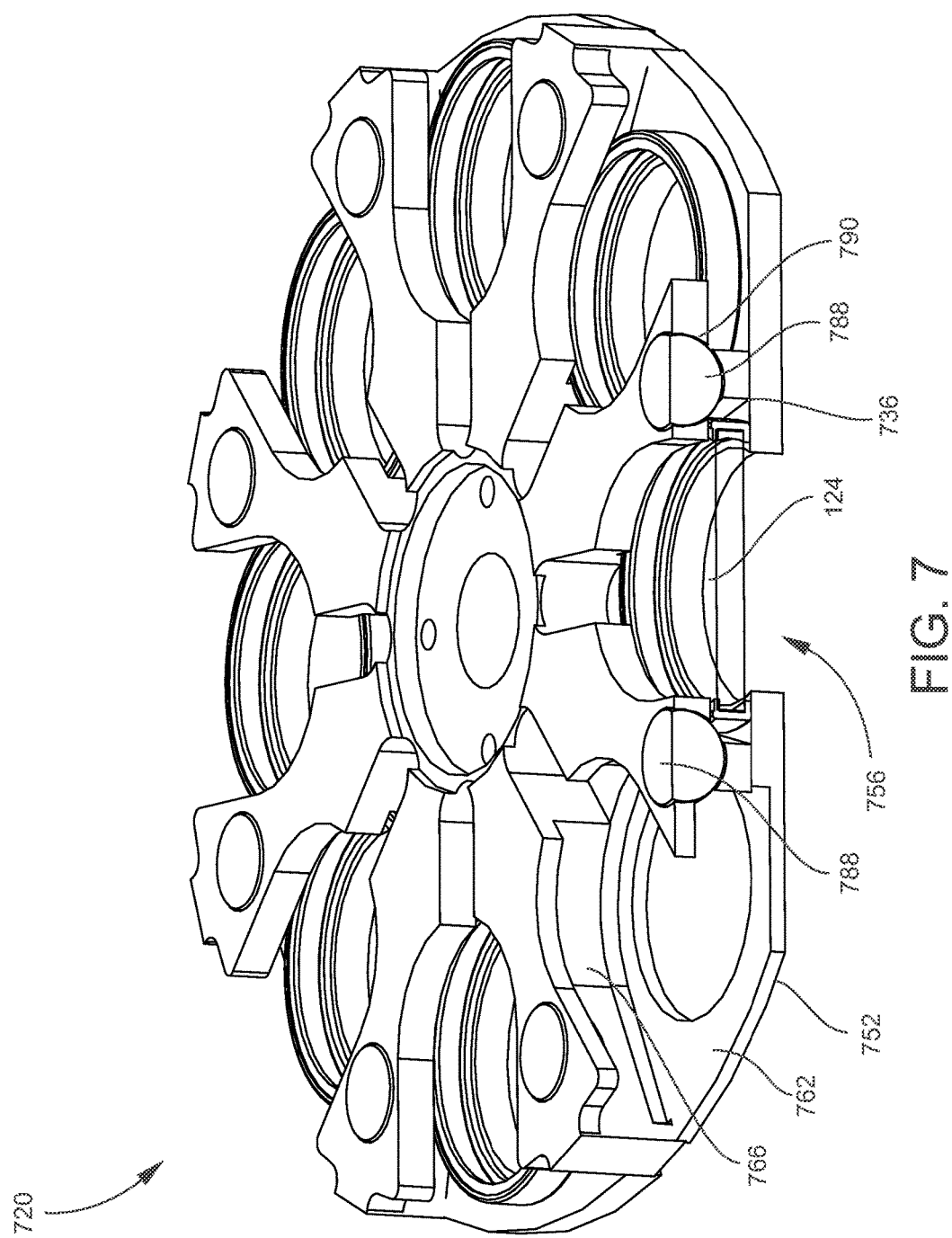
FIG. 7 is a cutaway perspective view of an example of an optical element holder according to another embodiment

FIG. 7 is a cutaway perspective view of an example of an optical element holder 720 according to another embodiment, in which a portion of the optical element holder 720 is cut away along a plane similar to that shown in FIGS. 4B, 5B, and 6. FIG. 7 also illustrates optical elements 124 loaded in respective optical element receptacles 756 of the optical element holder 720. As in other embodiments described above, the optical element holder 720 is configured as a disk or wheel that can be rotated about its central axis to select an optical element 124 for use in a given experiment.

The optical element holder 720 may include many of the same or similar components as those described above and illustrated in FIGS. 4A to 6. Thus, the body of the optical element holder 720 includes a plurality of optical element receptacles 756 for holding a like number of optical elements 124. The optical element receptacles 756 are each positioned at a radial distance from the central axis, and are circumferentially spaced from each other about the central axis. The optical element holder 720 includes radial openings 736 leading into the respective optical element receptacles 756. The body of the optical element holder 720 includes at least a first body portion 752 that primarily defines or forms the optical element receptacles 756, including the radial openings 736 and the openings at the optical input side and the optical output side. The holder body may also include a second body portion (not shown), which may be similar to the second body portions described above and illustrated in FIGS. 4A to 5B. The optical element holder 720 further includes a plurality of pusher components, which may at least partially define the boundaries of the optical element receptacles 756 (or the optical element receptacles 756 and the radial openings 736). The pusher components (or portions thereof) may be configured generally as described above and illustrated in FIGS. 4A to 5B, and thus may generally extend outward in radial directions from the central axis, and may be attached to the second body portion or may be integral parts of the second body portion.

As in other embodiments, the pusher components function to retain the optical elements 124 in fixed, repeatable operating (or aligned) positions in the respective optical element receptacles 756, such that each optical element 124 when moved into the optical path is correctly aligned with the optical path. For this purpose, each pusher component may be configured for pushing or biasing the corresponding optical element 124 at an angle to both axes of the optical element holder 720, i.e., at an angle to the central axis and to the transverse (or radial) axis (as defined above), such that the optical element 124 is forced or biased into contact with (i.e., the optical element 124 bears against) at least one surface of the optical element holder 720 such as a surface of the optical element receptacle 756. The pusher component is positioned so as to contact the optical element 124, and thereby apply the biasing force to the optical element 124, at some point while the optical element 124 is inserted into the optical element receptacle 756. Each pusher component includes a spring member (e.g., a deflectable structure, not shown) and at least one contact element 788 positioned to be biased by from the spring member. The spring member may be configured generally as described above and illustrated in FIGS. 4A to 5B. Surfaces of the optical element holder body facing the optical element receptacles 756, such as surfaces of the first body portion 752, may include recesses or pockets 790 that are sized, shaped, and positioned to accommodate the presence and movement of the contact elements 788.

As described above and illustrated in FIGS. 4A to 5B, each contact element 688 may be positioned at the end of each spring member. In the present embodiment, each contact element 688 is sized and positioned such that at least two portions of each contact element 688 face respective adjacent optical element receptacles 756, as shown in FIG. 7. These two portions may be portions of a single contact surface (i.e., a single outer surface) of the contact element 688, or the two portions may be two distinct contact surfaces of the contact element 688. In either case, the contact elements 688 associated with each optical element receptacle 756 are spaced from each other so as to be positioned generally on "opposing sides" of the perimeter of the optical element 124, as described above. By this configuration, at least two portions of respective contact elements 688 face each receptacle 756 on opposing sides thereof. Thus, the present embodiment is an example of dual-point biasing of each optical element 124 mounted to the optical element holder 720. In the present embodiment, the contact elements 788 are shaped as balls or spheres, which may be attached or integrated with the spring members, or may be separate components contacted by the spring members. As illustrated, the balls or spheres may be truncated, e.g., have flat top surfaces, which are contacted by (or attached to or integrated with) the corresponding spring members. As described above, the contact element 788 applies an angled biasing force to the optical element 124 that has a force component in a direction along the central axis and a force component in a direction along the transverse (or radial) axis. Consequently, the pusher components associated with each optical element receptacle 756 bias the corresponding optical element 124 into contact with at least one surface of the optical element holder 720, such as a transverse surface 762 (or both the transverse surface 762 and a longitudinal surface 766) of the first body portion 752.

Other embodiments of an optical element holder as described herein may include different combinations of features described above and illustrated in FIGS. 1 to 7. For example, an optical element holder such as described above and illustrated in FIGS. 4A to 4C, FIGS. 5A and 5B, FIG. 6, or FIG. 7 may include retaining or cornering features such as described above and illustrated in FIG. 3.

It will be understood that terms such as "communicate" and "in . . . communication with" (for example, a first component "communicates with" or "is in communication with" a second component) are used herein to indicate a structural, functional, mechanical, electrical, signal, optical, magnetic, electromagnetic, ionic or fluidic relationship between two or more components or elements. As such, the fact that one component is said to communicate with a second component is not intended to exclude the possibility that additional components may be present between, and/or operatively associated or engaged with, the first and second components.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. An optical element holder for an optical instrument, the optical element holder comprising:
    a body comprising an optical input side, an optical output side, a thickness along a longitudinal axis between the optical input side and the optical output side, and a plurality of receptacles configured to retain respective optical elements and generally arranged in a transverse plane orthogonal to the longitudinal axis, wherein each receptacle is open to the optical input side and to the optical output side to define an optical path through the body parallel to the longitudinal axis; and
    a plurality of pusher components extending from the body, each pusher component comprising a spring member and at least one contact element extending from or separate from the spring member and having a contact surface positioned to be biased by the spring member toward at least one of the receptacles and into contact with an optical element retained in the receptacle, a contact element extending from or separate from the spring member, and the contact element comprises the contact surface,
    wherein each pusher component is configured to apply a biasing force against at least one optical element retained in a respective one of the receptacles to retain the at least one optical element in an aligned position at which the at least one optical element is parallel to the transverse plane.

2. The optical element holder of claim 1, wherein the body comprises a plurality of receptacle surfaces, each receptacle is defined by at least one of the receptacle surfaces, and each pusher component is configured to apply the biasing force such that the at least one optical element in the aligned position is biased into contact with at least one of the receptacle surfaces.

3. The optical element holder of claim 2, wherein the at least one receptacle surface with which the at least one optical element is biased into contact comprises a transverse receptacle surface generally parallel to the transverse plane.

4. The optical element holder of claim 2, wherein the plurality of receptacle surfaces comprises a transverse receptacle surface generally parallel to the transverse plane, and each pusher component is configured to apply the biasing force such that the at least one optical element in the aligned position is biased into contact with the transverse receptacle surface.

5. The optical element holder of claim 1, wherein the body comprises a plurality of cornering features, at least one cornering feature is positioned at each receptacle, and each pusher component is configured to apply the biasing force such that the at least one optical element in the aligned position is biased into contact with the at least one cornering feature.

6. The optical element holder of claim 1, wherein the body is rotatable about the longitudinal axis, and the receptacles are positioned at a radial distance from the longitudinal axis and are circumferentially spaced from each other; and wherein the spring members extend in radial directions away from the longitudinal axis and between adjacent receptacles.

7. The optical element holder of claim 1, wherein each pusher component is configured to apply the biasing force at an angle to the longitudinal axis and to the transverse plane.

8. The optical element holder of claim 1, wherein the spring member is a planar structure comprising an elongated dimension and is deflectable in a direction generally orthogonal to the elongated dimension.

9. The optical element holder of claim 1, wherein the spring members extend in radial directions away from the longitudinal axis.

10. The optical element holder of claim 1, wherein:
    each spring member comprises at least a first arm and a second arm;

at least one contact surface extends from each of the first arm and the second arm;
the first arm is positioned to bias the at least one contact surface extending therefrom toward a first one of the receptacles; and
the second arm is positioned to bias the at least one contact surface extending therefrom toward a second one of the receptacles adjacent to the first receptacle.

11. The optical element holder of claim 1, wherein each pusher component comprises a single contact surface positioned to be biased by the spring member toward one of the receptacles.

12. The optical element holder of claim 1, wherein each pusher component comprises at least two separate contact surfaces.

13. The optical element holder of claim 12, wherein the at least two separate contact surfaces are positioned to be biased by the spring member toward at least two respective receptacles.

14. The optical element holder of claim 1, wherein at least one contact surface of each pusher component comprises at least two portions positioned to be biased by the spring member toward at least two respective receptacles.

15. An optical instrument, comprising:
a light detector;
optics configured for establishing an optical path to the light detector; and
the optical element holder of claim 1, wherein the optical element holder is configured for selectively moving each of the receptacles into the optical path.

16. The optical instrument of claim 15, further comprising a sample stage for supporting a sample, wherein the optics comprise a light source, the optical path comprises an excitation light path directed from the light source to the sample stage, and the optical element holder is configured for selectively moving each of the receptacles into the excitation light path.

17. The optical instrument of claim 15, further comprising a sample stage for supporting a sample, wherein the optical path comprises an emission light path directed from the sample stage to the light detector, and the optical element holder is configured for selectively moving each of the receptacles into the emission light path.

* * * * *